United States Patent [19]
MacNabb

[11] 3,933,582
[45] Jan. 20, 1976

[54] PLUTONIUM FUEL ADJACENT BURNABLE POISON

[75] Inventor: William V. MacNabb, Rockville, Md.

[73] Assignee: General Electric Company, San Jose, Calif.

[22] Filed: Sept. 10, 1973

[21] Appl. No.: 395,827

Related U.S. Application Data

[63] Continuation of Ser. No. 156,454, Dec. 30, 1970, abandoned, which is a continuation of Ser. No. 762,946, Sept. 26, 1968, abandoned.

[52] U.S. Cl.................. 176/78; 176/68; 176/93 BP
[51] Int. Cl............................................... G21c 3/32
[58] Field of Search............ 176/21, 68, 73, 76, 78, 176/93 R, 93 BP

[56] References Cited
UNITED STATES PATENTS

| | | |
|---|---|---|
| 2,984,613 | 5/1961 | Bassett.................................. 176/68 |
| 3,042,598 | 7/1962 | Crowther.............................. 176/68 |
| 3,122,484 | 2/1964 | Iskenderian...................... 176/93 R |
| 3,147,191 | 9/1964 | Crowther.............................. 176/68 |
| 3,275,525 | 9/1966 | Bloomster et al...................... 176/73 |
| 3,382,153 | 5/1968 | Bigge et al............................. 176/78 |
| 3,427,222 | 2/1969 | Biancheria et al................ 176/93 R |

FOREIGN PATENTS OR APPLICATIONS 1,046,965   10/1966   United Kingdom............ 176/93 BP Primary Examiner—Stephen C. Bentley
Attorney, Agent, or Firm—Ivor J. James, Jr.; Samuel E. Turner; Sam E. Laub

[57] ABSTRACT

A nuclear fuel assembly utilizing fissile fuel of high fission cross section, such as plutonium, in the fuel adjacent burnable poison to reduce local power perturbations.

2 Claims, 5 Drawing Figures

INVENTOR:
WILLIAM V. MACNABB

PLUTONIUM FUEL ADJACENT BURNABLE POISON

This application is a continuation of U.S. patent application Ser. No. 156,454, filed Dec. 30, 1970, now abandoned, which in turn is a continuation of U.S. patent application Ser. No. 762,946, filed Sept. 26, 1968, now abandoned.

While not limited thereto, the present invention is adaptable for use in a fluid cooled and moderated reactor. In a known type of water reactor, for example, as used in the Dresden Nuclear Power Station near Chicago, Ill., the reactor core is of the heterogeneous type, that is, the nuclear fuel is in the form of elongated, cladded rods. These fuel rods or elements are grouped together and contained in open-ended tubular flow channels to form separately removable fuel assemblies or bundles. A sufficient number of fuel assemblies are arranged in a matrix, approximxately a right circular cylinder, to form the nuclear reactor core capable of self-sustained fission reaction. The core is submersed in a fluid, such as a light water, which serves both as a coolant and as a neutron moderator. A plurality of control rods, containing neutron absorbing material, are selectively insertable among the fuel assemblies to control the reactivity of the core.

In a copending patent application by David L. Fischer et al, entitled "Reactivity and Power Distribution Control of Nuclear Reactor", Ser. No. 762,776, now abandoned, filed on even date herewith, the use of highly self-shielding burnable poison in a relatively few of the fuel rods of a nuclear reactor core is described.

As pointed out there, in the use of highly self-shielding burnable poison in this manner, the density of the poison required for substantial self-shielding is such that the initial local power density in the fuel rod containing the poison is depressed because the poison shields the fuel and competes with the fuel for neutrons, thus the poisoned fuel rod perturbs the local power distribution and increases the local power peaking (the ratio of the local-to-average power in the fuel rods of the fuel assembly). To alleviate this undesirable effect, the above referenced application describes and claims the use of plutonium in the poisoned fuel.

It has been discovered that the use of highly self-shielding burnable poison in a relatively few fuel rods of the reactor core not only depresses the power density in the poisoned fuel, but it also initially depresses the power density in the adjacent fuel within about one neutron diffusion length of the burnable poison. As the burnable poison depletes with exposure, the power density in the adjacent fuel increases. Thus the power density in the adjacent fuel is depressed during the early part of the fuel cycle and later in the fuel cycle the power density may increase to undesirable levels. In both cases, the power distribution is perturbed and undesirable local power peaking can result.

It is an object of the present invention to minimize local power perturbations in fuel adjacent burnable poison.

In well-known nuclear power reactor fuel, fertile atoms are included with the fissile atoms. For example, a commonly used fuel consists of uranium dioxide ($UO_2$) in which about 2 percent of the uranium atoms are fissile U-235 while the remaining uranium atoms are the fertile isotope U-238. In the course of operating the reactor, the fissile atoms (U-235) are gradually consumed and a portion of the fertile atoms (U-238) are converted to a fissile plutonium isotope (Pu-239). The Pu-239 thus contributes to the maintenance of the chain fission reaction. As the fuel is exposed, the concentration of Pu-239 increases and approaches an equilibrium value. Thus when the irradiated fuel is removed from the reactor, it contains, in addition to a valuable quantity of the original fissile material, a significant quantity of plutonium including fissile PU-239 and Pu-241 and fertile Pu-240. Such fuel can be reprocessed to separate and recover the plutonium fuel. When the cost of the recovered plutonium fuel becomes competitive with the cost of uranium fuel, it is desirable to utilize the plutonium fuel in the reactor. The use of plutonium fuel in a reactor designed to use uranium fuel requires consideration of the differences in reactor performance because of the differences in the nuclear characteristics of the two fuels. For example, the thermal neutron absorption cross sections of the plutonium isotopes are greater than those of the uranium isotopes.

It is another object of the invention to utilize plutonium fuel in fueling or refueling a nuclear reactor.

These and other objects are achieved in accordance with the invention by utilizing plutonium fuel in the fuel adjacent burnable poison. Because of its greater fission cross section as compared to the lower fission cross section of uranium, the initial power density in the plutonium fuel tends to be greater than in uranium fuel. This helps to overcome the initial depressive effect of the adjacent burnable poison. Furthermore, the greater absorption cross section of plutonium causes it to deplete more rapidly than uranium. This aids in preventing power peaking later in the fuel cycle. Thus the present invention aids in flattening the local power distribution (the distribution of power within a fuel assembly) and makes advantageous use of plutonium fuel.

The invention is described more specifically hereinafter with reference to the accompanying drawing wherein.

Figure 1:
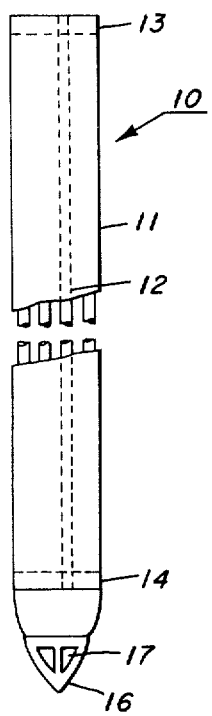
FIG. 1 is an elevation of a typical nuclear fuel assembly.

A typical fuel assembly 10 is illustrated in elevation view in FIG. 1. The fuel assembly 10 comprises a tubular flow channel 11 of square cross section containing, for example, a 6 × 6 array of spaced fuel elements or rods 12 supported between upper and lower tie plates 13 and 14. A nose 16 is provided with openings 17 through which the coolant is received to flow upward past the fuel elements. (A fuel assembly is shown in greater detail by D. A. Venier, et al, in U.S. Pat. No. 3,350,275). The fuel elements 12 may be formed of a tube containing a plurality of cylindrical pellets of fuel as shown, for example, by J. L. Lass, et al, in U.S. Pat. No. 3,365,371. It is contemplated that the fuel assembly 10 also contains concentrated burnable poison, for example, in the form of rods or tubes or mixed with the fuel of one or more of the fuel elements as shown in the aforementioned copending patent application Ser. No. 762,776.

Figure 2:
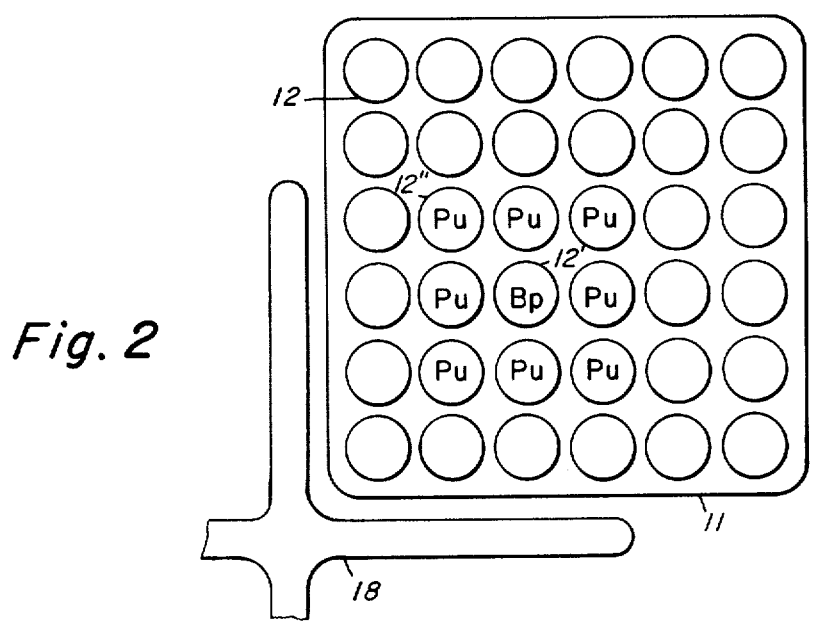
FIG. 2 is a schematic plan view of the fuel assembly.

The fuel assembly 10 is illustrated in schematic plan view in FIG. 2 together with a control rod 18 of cruciform shape. By way of example, it is assumed that a fuel rod 12' legended Bp contains burnable poison of sufficient density to initially depress the power density in the adjacent fuel rods if these fuel rods contain the usual uranium fuel.

In accordance with the invention, to reduce the local power perturbations in the fuel rods adjacent the poisoned fuel rod, plutonium fuel is used in the regions that are strongly affected by the burnable poison or in a thermal reactor (a reactor in which most of the fissions are caused by thermal neutrons) plutonium fuel is used within about one thermal neutron diffusion length of the burnable poison. (A neutron diffusion length is defined as the square root of one-sixth of the average square of the straight-line distance that a neutron travels from the time it becomes thermal to the time it is captured.)

In the example fuel assembly shown in FIGS. 1 and 2, the fuel rods are about one-half inch in diameter and the fuel assembly is about 5 inches across. Thus the fuel within about one thermal neutron diffusion length of the poisoned rod 12' includes the fuel in the eight adjacent fuel rods 12" which are legended Pu to indicate that these adjacent fuel rods contain plutonium fuel in accordance with the invention (while the nonadjacent fuel rods 12 contain only uranium or other fuel of lower fission cross section than plutonium). In other words, in the example illustrated in FIG. 2, the rods 12 contain the usual uranium fuel, the rod 12' is modified by the addition of burnable poison and the adjacent rods 12" are modified by the replacement of at least some of the uranium with high fission cross section plutonium.

Figure 3:
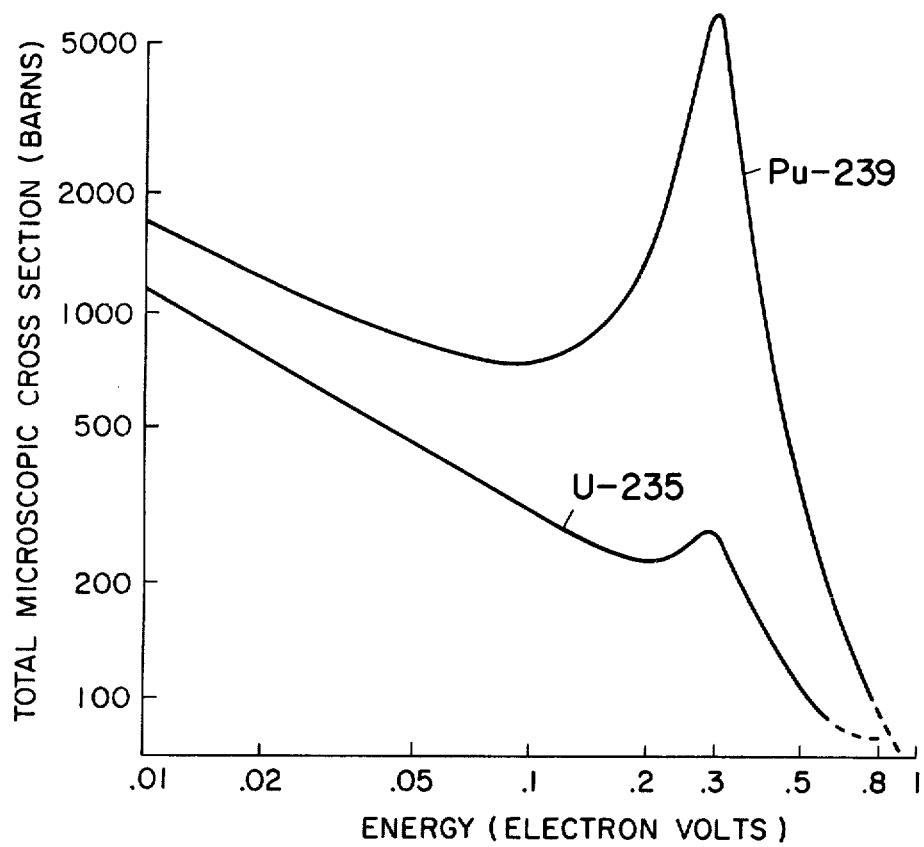
FIG. 3 illustrates the thermal energy dependent microscopic cross sections of uranium and plutonium fuel.

As mentioned hereinbefore, the effectiveness of plutonium fuel in reducing perturbations in power density results from the greater neutron absorption cross section of plutonium as compared to uranium. This is illustrated in FIG. 3 which shows the total cross section of Pu-239 as compared to the total cross section of U-235 over the thermal neutron energy range. It is seen that the cross section of Pu-239 is greater than that of U-235 for neutron energies below about 0.85 electron volts.

Figure 4:
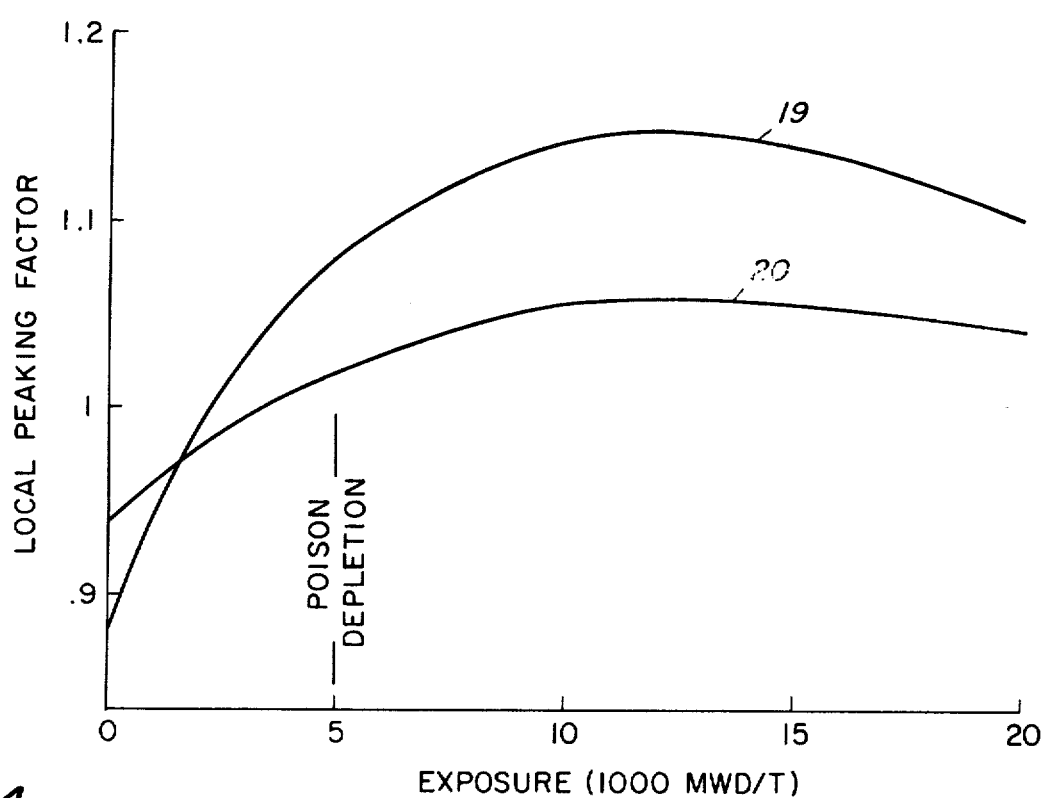
FIG. 4 illustrates the trends in local peaking factor with exposure for a fuel assembly containing only uranium fuel as compared to a fuel assembly containing plutonium fuel adjacent burnable poison.

The results of the invention are illustrated by the local peaking factor versus exposure curves of FIG. 4. (The local peaking factor is the ratio of the power density at a given elevation in a given fuel rod to the average power density at that elevation in the fuel assembly.) A curve 19 illustrates the prior art case of the usual uranium fuel in the fuel rods 12" adjacent the poisoned fuel rod 12'. In this prior art case, it is seen that the power density is depressed during the early part of the exposure while later in the exposure, after the burnable poison has been depleted, the power density increases to an undesirable level. (For this example it is assumed that the fuel has an exposure lifetime of about 20,000 megawatt days per ton and that the burnable poison is depleted in about one-quarter of this exposure. This might be the case, for example, in accordance with a known refueling schedule wherein only about one-fourth of the fuel assemblies of the core are replaced in a distributed pattern at each refueling.)

A curve 20 in FIG. 4 illustrates the reduced change in local peaking factor achieved in accordance with the invention by placing plutonium fuel in the fuel rods 12" adjacent the poisoned fuel rod 12'. Because of its greater absorption cross section, the plutonium competes with the burnable poison for neutrons more favorably than uranium to provide a greater power density during the early portion of the exposure. The plutonium thus depletes more rapidly than uranium with a resulting lower maximum local peaking factor later in the exposure history.

The relative amount of plutonium fuel used in the fuel rods 12" depends upon the particular circumstances. Consistent with minimizing the variation of local peaking factor with exposure, the plutonium content may be increased to the extent that the maximum local power density with exposure in the plutonium containing fuel rods 12" approaches the maximum local power density in any other of the fuel rods of the assembly. In the illustrated embodiment, the general trend of the curve 20 (FIG. 4) may be provided by about 1.2 atom percent fissile plutonium and about 1.8 atom percent fissile uranium in the fuel rods 12".

Figure 5:
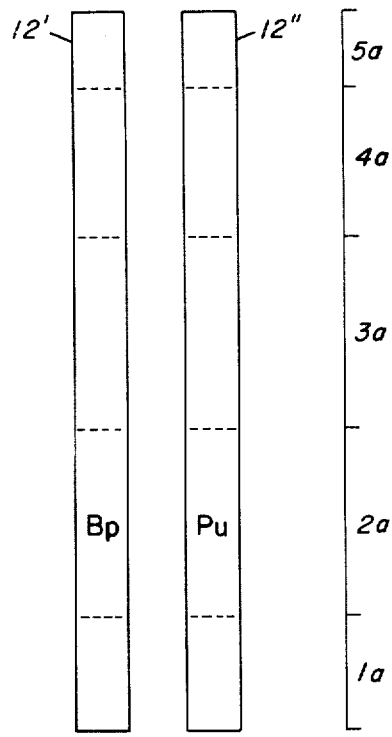
FIg. 5 illustrates the aixal juxtapositioning of burnable poison and plutonium fuel.

In some applications, such as shown in the aforementioned patent application Ser. No. 762,776, the burnable poison may be axially distributed along the poisoned fuel rod and in some cases the burnable poison is contained in a limited axial part or portion of the poisoned fuel rod. In such cases it may be desirable to use plutonium fuel in accordance with the invention only at the elevations in the adjacent rods 12" corresponding to the elevations of the burnable poison in the poisoned fuel rod 12'. This is illustrated by way of example in FIG. 5 wherein the poisoned fuel rod 12' contains burnable poison (Bp) and an adjacent fuel rod 12: contains plutonium (Pu) in accordance with the invention only in an axial zone 2a.

Thus what has been described is a nuclear fuel assembly adapted to utilize plutonium fuel to minimize the perturbations in power density caused by the presence of lumped burnable poison.

While illustrative embodiments of the invention have been described herein, modifications and adaptations thereof may be made by those skilled in the art without departure from the spirit and scope of the invention as defined by the following claims.

What is claimed is:

1. A fuel assembly for use in a nuclear reactor core comprising: a plurality of spaced apart elongated fuel elements, burnable poison in at least one of said fuel elements, fissile plutonium in all of the fuel elements which are adjacent said one of said fuel elements, the initial fissile fuel in the fuel elements which are more remote from said one of said fuel elements than said adjacent fuel elements consisting of fissile uranium whereby the initial power in said fuel adjacent said one of fuel elements in said core is increased relative to the initial power in said more remote fuel elements as compared to a similar fuel assembly wherein all of the initial fissile fuel consists of uranium.

2. A fuel assembly for use in a nuclear reactor core comprising a plurality of spaced apart elements including: a first element in said assembly containing a burnable poison, a first plurality of fuel elements surrounding said first element and spaced therefrom within about one neutron diffusion length, a second plurality of fuel elements in said assembly spaced from said first element more than one neutron diffusion length, said first plurality of fuel elements containing initial fissile plutonium, and the initial fissile fuel in said second plurality of fuel elements consisting of fissile uranium whereby the initial power in said first plurality of fuel elements in said core is increased relative to the initial power in said second plurality of fuel elements as compared to a similar fuel assembly wherein all of the initial fissile fuel consists of uranium.

* * * * *